July 28, 1942.  S. L. ADORNEY  2,291,197
SLAB
Filed May 13, 1939
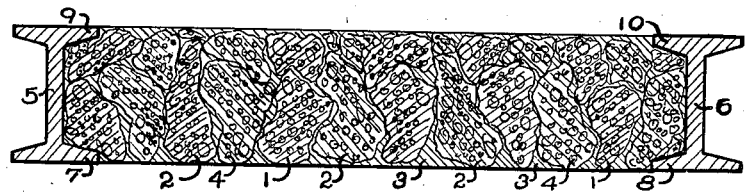
Fig. 1
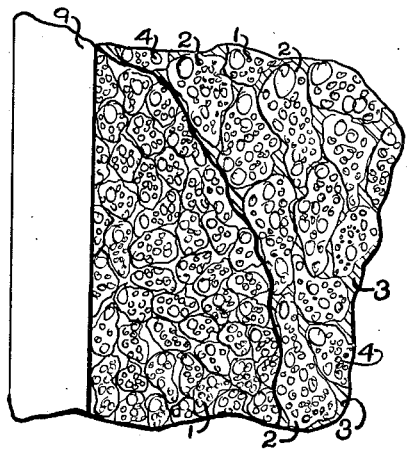
Fig. II
SAM L. ADORNEY.
INVENTOR.
BY O.Z.McCoy
ATTORNEY.

Patented July 28, 1942

2,291,197

UNITED STATES PATENT OFFICE 2,291,197

SLAB

Sam L. Adorney, Cleveland, Ohio

Application May 13, 1939, Serial No. 273,521

3 Claims. (Cl. 72—69)

This invention relates to structural materials and more particularly to the composition, method of assembly and article, of an improved fireproof unit of construction for buildings and the like.

Considerable work has and is being done on structural materials, that is directed toward the control and the prevention of the staggering annual fire losses in property and life in structures in which capital is invested and in which property of value may be stored and particularly in homes, schools, hotels, industrial plants, office buildings, garages and the like, and also toward the improvement of living and working conditions in all types of buildings that are occupied all or part of the time.

The present invention is directed toward furthering this improvement work by providing a fireproof composition, method of assembly and article that is adapted for rapid, large scale building construction with a moderate expenditure of effort and money.

Another object is to provide an improved building slab for any inhabited dwelling that is fireproof, that has ample strength for conventional building specifications, and that is healthful.

A further object is to provide a composition and article wherein members are interlocked transversely substantially thruout the structure of the article to resist deformation under load and that are bonded together with a single material that has a substantially uniform force of adhesion to the members thruout the structure.

Another object is to provide a composition, method of assembly and article that may be made with moderately priced materials and labor.

With the above and other objects in view that will be apparent to those who are familiar with the structural practices, materials and problems that are encountered in this field from the following description, the present invention is directed toward providing an improved building composition, method of assembly and article that, for the purposes of illustration and explanation, may be represented by a building unit or slab and that is shown in the accompanying drawing, wherein:

Fig. 1 is a section taken transversely thru a pair of girders with an illustrative slab disposed therebetween; and Fig. 2 is a fragmentary plan view of the slab that is shown in Fig. 1 prior to the pouring operation of all of the bonding material.

The slab comprises broadly a composition of substantially hand picked pieces of slag or the like, that are disposed substantially on edge and closely packed and wedged together and that are uniformly bonded together thruout the structure with a suitable material such as the plaster of Paris composition known as hydrostone, or the like. The term "hydrostone" is used herein as designating the material that is described in the Patent Number 2,032,071 issued to Herman A. Scholz on February 25, 1936, or to similar or related materials that have suitable structural characteristics.

In the accompanying drawing the pieces of slag 1 are disposed closely adjacent each other substantially thruout the structure with interlocking pieces 2 that preferably extend continuously thruout the thickness or depth of the slab and between which the other pieces of slag are tightly wedged. The pieces of slag extend longitudinally of the slab any desired distance consistent with the size of the slab and materially assist in strengthening the slab longitudinally as their length increases.

A suitable bonding material, such as the plaster of Paris 3 or the like, fills substantially all of the interstices or voids between the roughly complementary pieces of slag and extends into the cavities 4 in the pieces of slag to provide a strong adhesive attachment to the slag and a substantially uniform mechanical strength thruout the slab.

The slab may be made to assume the contour of any desired mould in which it is constructed. It is supported laterally by any suitable means, such as by the webs 5 and 6 of the spaced girders that are shown in the accompanying drawing. The weight of the slab may be supported in any desired manner, as by the lower flanges 7 and 8 of the girders.

Where the slab forms the floor of a building or the like, its upper surface is made substantially flush with the upper flanges 9 and 10 of the girders.

The girders are rigid and any load that is applied vertically downward on the slab will be applied, not only to the girder lower flanges 7 and 8 but, because of the wedged condition of the slag, will be resolved into horizontal components applied to the girder webs 5 and 6 that effectually prevent lateral spreading of the slab.

The slag that is used in the slab is preferably of the class that is commercially known as light, Number 1 slag. This is a light weight slag that produces a slab that weighs in the neighborhood of 70 pounds per cubic foot, of which the slag was computed as comprising about 44 pounds.

This is subject to considerable variation because of the necessary variation in the volume of the voids that exist between the pieces of slag. The light slag is preferred to the heavier forms of slag that would increase the weight of the completed slab, and that would be less porous and therefore present less area of adhesion for the bonding material that is disposed between the pieces of slag.

In the model that was constructed and was subjected to test, the slag used was in pieces that were three inches or more in thickness and from four to ten inches in length. The individual pieces weighed from two to fifteen pounds each. The model was three feet square and six inches in depth. This model was supported at its edges to provide a substantially three foot span and has proven by test that it will support a bending load of substantially 300 pounds per square foot.

In the construction of the slab the pieces of slag to be used are first cleaned thoroughly, as by being washed with clear, clean water or the like, so that the slag is free from any foreign matter, dust and the like, that can initiate slippage in the completed slab. The pieces of slag are then dried thoroughly so that the composition of the bonding material, such as the mixture of plaster of Paris and water, may be closely standardized and correctly computed.

The pieces of slag are then disposed substantially on edge in the form and are wedged as securely against each other as is practical without the use of tools or other means that would tend to create dust from the slag.

A water suspension of plaster of Paris is then prepared that is of sufficient fluidity so that it will flow freely down among the pieces of slag and completely fill all of the voids that exist therebetween, as well as to enter into the cavities in the surfaces of the pieces of slag to provide a secure bond of adhesion therewith. The plaster of Paris and water mixture must be a free-running, thoroughly mixed suspension that is free from lumps and the like. This plaster of Paris-water suspension is poured rapidly into the mould until it rises flush with the upper flanges 9 and 10 of the girders or the top of the mould. The temperature of pouring the plaster of Paris and water mixture should be above freezing and preferably above 40° F.

Because of the rapidity with which the plaster of Paris sets, this process may be worked out so that it is substantially continuous and the plaster of Paris-water suspension may be supplied to the work from a hose or the like, and may follow up the workers who are placing the pieces of slag in the forms, as between the girders or the like.

In the model referred to above it was found that a satisfactory plaster of Paris and water suspension resulted when the weight of the water added to the plaster of Paris amounted to around three-fourths of the weight of the plaster of Paris.

During the period when the slag is being placed in the form and the plaster of Paris is taking its set, the slab may be supported in any desired manner, as by a wood, metal or other supporting means disposed beneath and making water sealing engagement with the girder lower flanges 7 and 8, and transversely or not of the girders, as is found necessary by the particular work being done. In this manner ample support is provided for the slab while the pieces of slag are being packed and wedged tightly into place with other pieces of slag in such a manner as to roughly complement each other to allow the infiltration of the bonding material and until the plaster of Paris bonding material arrives at a desired degree of set.

Where the preferred slag is procured with difficulty, or where another form of similar material is more readily available or preferred, as where ample quantities of highly porous volcanic rock, pumice, or the like, are accessible or less expensive and equally desirable, these or other suitable materials may be substituted for the slag.

The slab is believed to be definitely superior to concrete for floors and the like in inhabited buildings. Concrete and similar materials sweat, accumulate or adsorb water on the surface which produces a chill and unwholesome atmosphere and is alleged to produce rheumatism and the like. The slab, however, has a tendency to continuously absorb excessive moisture and thereby maintains more wholesome living conditions and as a result minimizes this objectionable and injurious characteristic that attends the use of concrete and the like. The slab is also believed to increase in hardness and strength as a result of continued setting.

The plaster of Paris sets very quickly as compared with other materials and this characteristic permits the early removal of the supporting forms and the rapid progress of the work.

Substitutions may, if desired, be made in the bonding material also, as where another kind of preferably light weight bonding material that has advantageous characteristics that are similar to those of plaster of Paris products is preferred.

It is to be understood that the illustrative materials, their method of assembly and the resultant article, that are disclosed herein, have been presented for the purposes of illustration and explanation and that various modifications may be made therein without departing from the spirit of the invention as defined by the appended claims.

What I claim is:

1. A structural slab, comprising in combination, irregular chunk-like pieces of slag having a surface promontory on one piece seating into a surface depression in another piece to make mechanically wedging engagement therebetween substantially thruout said slab, and the plaster of Paris material hydrostone disposed among said pieces of slag and bonded thereto.

2. A structural slab, comprising a plurality of substantially thin pieces of stone disposed substantially on edge and separately having a depression portion and a promontory portion whereby adjacent stones make roughly complementary interlocking keyed engagement with each other substantially thruout said slab, in combination with a plaster of Paris hydrostone bonding material substantially filling the interstices among the stones.

3. A structural body, comprising in combination, substantially clean surfaced interlocking chunks of slag contacting each other with chunk promontory portions seating in chunk depressions and overlapping end portions substantially thruout said body, and a plaster of Paris product substantially completely filling the interstices between said slag chunks and penetrating surface apertures therein for making keyed engagement with said slag chunks.

SAM L. ADORNEY.